(12) United States Patent
McCall et al.

(10) Patent No.: US 7,447,929 B2
(45) Date of Patent: Nov. 4, 2008

(54) COUNTERING POWER RESONANCE

(75) Inventors: James A. McCall, Beaverton, OR (US);
Joe H. Salmon, Placerville, CA (US)

(73) Assignee: Intel Corporation, Santa Clara, CA (US)

( * ) Notice: Subject to any disclaimer, the term of this patent is extended or adjusted under 35 U.S.C. 154(b) by 574 days.

(21) Appl. No.: 11/243,291

(22) Filed: Sep. 29, 2005

(65) Prior Publication Data
US 2007/0074055 A1 Mar. 29, 2007

(51) Int. Cl.
*H04B 1/10* (2006.01)

(52) U.S. Cl. .................. 713/323; 713/320; 713/321; 713/322; 713/324; 369/39; 327/551; 320/139

(58) Field of Classification Search ......... 713/320–324; 363/39; 327/551; 320/139
See application file for complete search history.

(56) References Cited

U.S. PATENT DOCUMENTS 5,621,396 A * 4/1997 Flaxl .................. 340/10.4
6,496,556 B1 * 12/2002 Huehne et al. .................. 377/2
6,534,955 B1 * 3/2003 Wae .............................. 320/139
6,631,082 B2 * 10/2003 Birumachi .................... 363/97
7,054,172 B2 * 5/2006 Culler .......................... 363/39
7,119,607 B2 * 10/2006 Huang et al. ................. 327/551
2001/0036092 A1 * 11/2001 Yasumura ................ 363/21.04
2004/0239302 A1 * 12/2004 Culler ......................... 323/300

* cited by examiner

*Primary Examiner*—Abdelmoniem Elamin
(74) *Attorney, Agent, or Firm*—Blakely, Sokoloff, Taylor & Zafman LLP

(57) ABSTRACT

An embodiment may comprise a counter to provide a count value, enable logic coupled with the counter, and circuitry coupled with the enable logic, the circuitry to be powered up or down if the counter value is outside of a resonance bandwidth for the circuitry to be powered up or down. An embodiment may comprise a method of initializing a counter while circuitry is placed in a standby mode, reading the counter, and powering up the circuitry if the counter does not indicate a resonance bandwidth. An embodiment may be a system comprising a device including a power delivery network to deliver power, a link coupled with the device, the link to electrically communicate with the device, and control circuitry coupled with the link, the control circuitry to limit the link from powering up or down at a resonant frequency of the power delivery network.

21 Claims, 3 Drawing Sheets

COUNTERING POWER RESONANCE

BACKGROUND

Power delivery/distribution networks (PDN) typically need to provide a stable direct current (DC) voltage. In order to supply stable voltage to individual logic gates, the PDN may need to manage power delivery through a motherboard, package interconnects, a package, integrated circuit (IC) interconnects, on-chip circuitry, and eventually to individual logic gates and transistors. PDNs must meet specific constraints at each level in order to ensure proper operation.

Semiconductors and signaling interfaces, as well as many other circuits that consume DC current, may power themselves down during idle or other limited usage periods. Power managing the DC current of the circuits may cause the PDN to operate at a resonant condition. This resonance condition could produce undesirable noise and impact the timing and voltage budget of the associated circuits, thus limiting system performance.

Generally, PDN resonance may be countered by reducing the impedance profile of the PDN network. The impedance profile may be reduced by modifying motherboard decoupling, package decoupling, on-die decoupling, by adding power pins, etc. By reducing the impedance profile, noise that occurs at a specific resonance peak may be brought within tolerable limits.

However, reducing the impedance profile of a PDN network comes at the expense mentioned above. For instance, a wirebond package might have to be converted to a flip-chip package to reduce inductance, on-die decoupling might be added to a semiconductor device at the expense of die area, etc.

BRIEF DESCRIPTION OF THE DRAWINGS

Embodiments of the invention may be best understood by reading the disclosure with reference to the drawings, wherein.

DETAILED DESCRIPTION

In the following description, numerous specific details are set forth. However, it is understood that embodiments of the inventions may be practiced without these specific details. In other instances, well-known circuits, structures, and techniques have not been shown in detail in order to not obscure the understanding of this description.

Reference in the specification to "one embodiment" or "an embodiment", etc., means that a particular feature, structure, or characteristic described in connection with the embodiment is included in at least one aspect of the invention. The appearances of the phrase "in one embodiment" in various places in the specification do not necessarily all refer to the same embodiment.

Generally, resonance may be countered by controlling operating frequency. Control of operating frequency to counter resonance is a low cost solution that can meet noise targets, and may be implemented with only a minor impact on performance, i.e. an increased latency caused by forcing a controller to avoid certain frequencies.

For example, an embodiment may involve a high-speed differential interface that consumes DC current in an idle state and can be powered down regularly to conserve power, reduce heat, etc. If the differential interface is powered up or down at a resonant frequency of a PDN, then considerable noise may result.

Therefore, the present embodiment may limit the power cycling from happening at resonant frequencies of a PDN. In this example, new bus designs have presented new design concerns, such as, data rates have outscaled physical changes in the circuitry in turn allowing new solutions. Since the PDN resonance has remained around 10-100 MHz since the physical dimensions are not changing that rapidly while the data rates have continued increasing with Moore's Law.

Conventional approaches absorbed the timing/voltage impact of PDN resonance. As data rates increase substantially, absorbing the timing/voltage impact of PDN resonance is increasingly a problem. Embodiments may in general be used to limit resonance in a broad range of circuitry, links, etc., by simply avoiding operation at resonant frequencies of the circuitry, links, etc.

An embodiment may use digital control of a functional block to keep a PDN from resonating. Furthermore, the present embodiment could be used to lower on-die capacitance and it further can provide a relatively low cost approach to control resonance without preventing valuable silicon area to be used for a functional goal, i.e. for logic functions.

Figure 1:
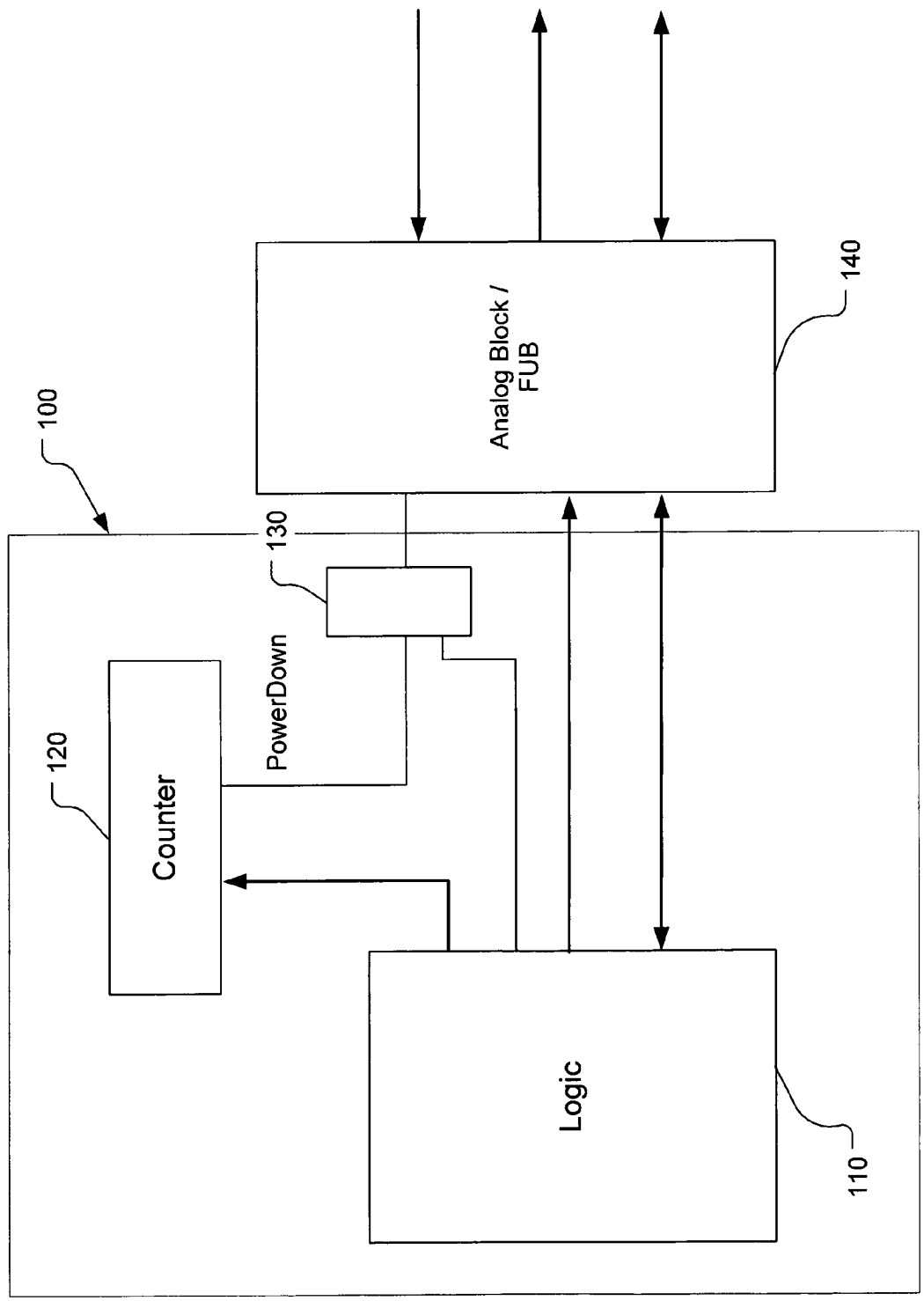
FIG. 1 illustrates an embodiment apparatus to counter resonance by controlling operating frequency.

FIG. 1 illustrates an embodiment 100 to counter resonance by controlling operating frequency. In FIG. 1, logic 110 is coupled with a counter 120 and a functional unit block (FUB) 140. In this example, functional unit block is an analog block, but embodiments need not be so limited. Also, counter 120 and logic 110 are shown coupled with a qualifier block 130 that receives outputs from the counter 120 and logic 110. In an embodiment the qualifier block 130 may be a second logic block. The qualifier block 130 receives an output from logic block 110 and qualifies it with the counter 120 output and controls the FUB 140 accordingly.

FUB 140 may have other inputs and outputs to send or receive data, or power, or other electronic signals. Although the different blocks of FIG. 1 are shown separately, any combination of them may reside in the same device, circuit, etc. For example, the counter 120 and the logic 110 may be part of the same IC, in the same package, on the same PCB, etc.

A PDN network can be managed to lower and shift a resonance point by changing the passive components of the network. Embodiments may use simple logic to eliminate certain areas of operation.

Referring to FIG. 1, logic 110 may be operative to enable or disable circuitry to limit resonance caused by the powering up or down of the circuitry. Resonance may happen, for example, in a PDN as a result of the circuitry being powered up and down at a resonant frequency of the PDN. Embodiments are not limited to FIG. 1 and may in fact be used to limit noise in any power network.

In the embodiment in FIG. 1, counter 120 may represent a "power management" time that designates a "no turn on zone" for some circuitry. The "no turn on zone" may be a range of counter values that represent a resonance bandwidth for circuitry. Furthermore, the embodiment in FIG. 1 includes logic 110 that may enable or disable some circuitry, for example FUB 140. In this regard, the counter 120 and logic 110 can counter resonance by restricting when some circuitry may be powered up or down to avoid resonance in a power network.

Referring to FIG. 1, counter 120 can be used to keep track of how long it has been since FUB 140 has been powered up. If counter 120 reaches a specified time, or provides a certain value, FUB 140 can be powered up or powered back down. Embodiments may also be used in conjunction with passive components that keep impedance at a resonant frequency at an acceptable level.

An embodiment apparatus 100 may comprise a counter 120 to provide a count value, enable logic 110 coupled with the counter 120, and circuitry 140 coupled with the enable logic 110, the circuitry 140 to be powered up or down if a counter value is outside of a resonance bandwidth for the circuitry 140 to be powered up or down. In an embodiment, a qualifier logic 130 may receive an output from the enable logic 110 and the counter 120 and may designate if the circuitry 140 is to be powered up or down based on the outputs of the counter 120 and enable logic 110.

In the present embodiment, the counter 120 may be operative to count a settling time, and have the circuitry 140 powered down if it is not being used. An embodiment may be operative to have the counter 120 reach a certain value before the circuitry 140 is powered down if the circuitry is being used. Embodiments may have at least one of the counter 120 and the enable logic 110 programmable.

Figure 2:
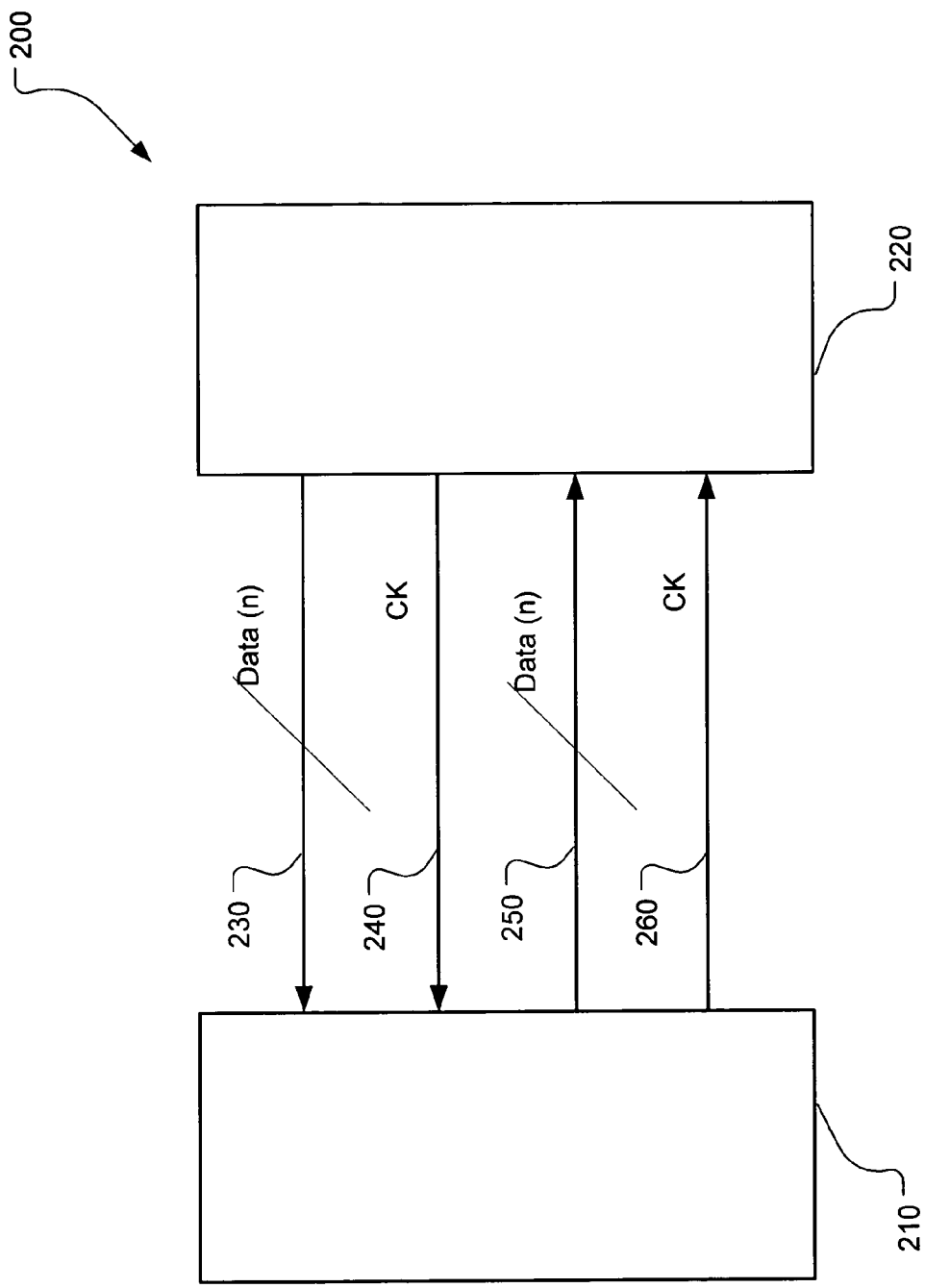
FIG. 2 illustrates an embodiment system to counter resonance by controlling operating frequency.

FIG. 2 illustrates an embodiment system to counter resonance by controlling operating frequency. In embodiment 200, a first device 210 and a second device 220 are coupled by links 230, 240, 250 and 260. Link 230 is a data link from device 220 to device 210 and has a width of "n" channels. Link 240 communicates clocking information for link 230. Link 250 is a data link from device 210 to device 220 and is "n" channels wide and is illustrated adjacent to link 260 which communicates clocking information for link 250.

The present embodiment illustrates two uni-directional busses comprising links 230, 240, 250 and 260, but need not be so limited. For example, the links may be differential/current mode driven links, or single ended/voltage mode driven links, uni-directional or bi-directional links, etc. The links may even have the clocking information in-band with the data signals, etc. In general, embodiments are not restricted to any type of link between the devices.

In the present embodiment, if the PDN resonance of one or more devices is understood, such as device 210 or device 220, the PDN solution can be reduced (package improvements, on-die decoupling capacitors, etc.), at the expense of restricting operation in the PDN envelope. Embodiments may apply to any power network where a worst case timing/voltage budget occurs at a PDN resonance of a device (s).

Referring to the embodiment in FIG. 2, the data links 230 and 250 may be powered down during idle periods to conserve power. The worst case device/channel timing & voltage budget can occur when the data links are powered up/down at the resonance of the PDN of either device 210 or device 220. Therefore either device 210 or device 220 may contain circuitry to counter resonance by controlling operating frequency.

An embodiment system may comprise a device 210 including a PDN to deliver power (PDN not shown, but is within device 210), a link 250 coupled with the device 210, the link 250 to electrically communicate with the device 210, and control circuitry coupled with the link 250, the control circuitry to limit the link from powering up or down at a resonant frequency of the PDN.

In FIG. 2, the control circuitry is not shown but could reside within device 210, or elsewhere. For example, the embodiment apparatus 100 from FIG. 1 may reside within device 210 and limit the link from powering up or down at a resonant frequency of the PDN of device 210. Embodiments need not be so limited however, and may reside within any of the devices in FIG. 2 or in separate devices or as stand alone circuitry.

In an embodiment the control circuitry may comprise a counter 120 and some enable logic 110 as shown in embodiment apparatus 100. In this embodiment the counter 120 can provide a counter value to keep track of the duration a link 250 has been either powered up or down, and the enable logic 110 can limit powering the link 250 up or down if the counter value represents that result resonance would result from powering the link 250 up or down.

The present embodiment may further comprise a second device 220 with a PDN, the second device coupled to a link such as link 230 or 250, the control circuitry to limit the link from powering up or down at a resonant frequency of the PDN of either device 210 or device 220. In an embodiment the counter or the enable logic may be programmable.

Figure 3:
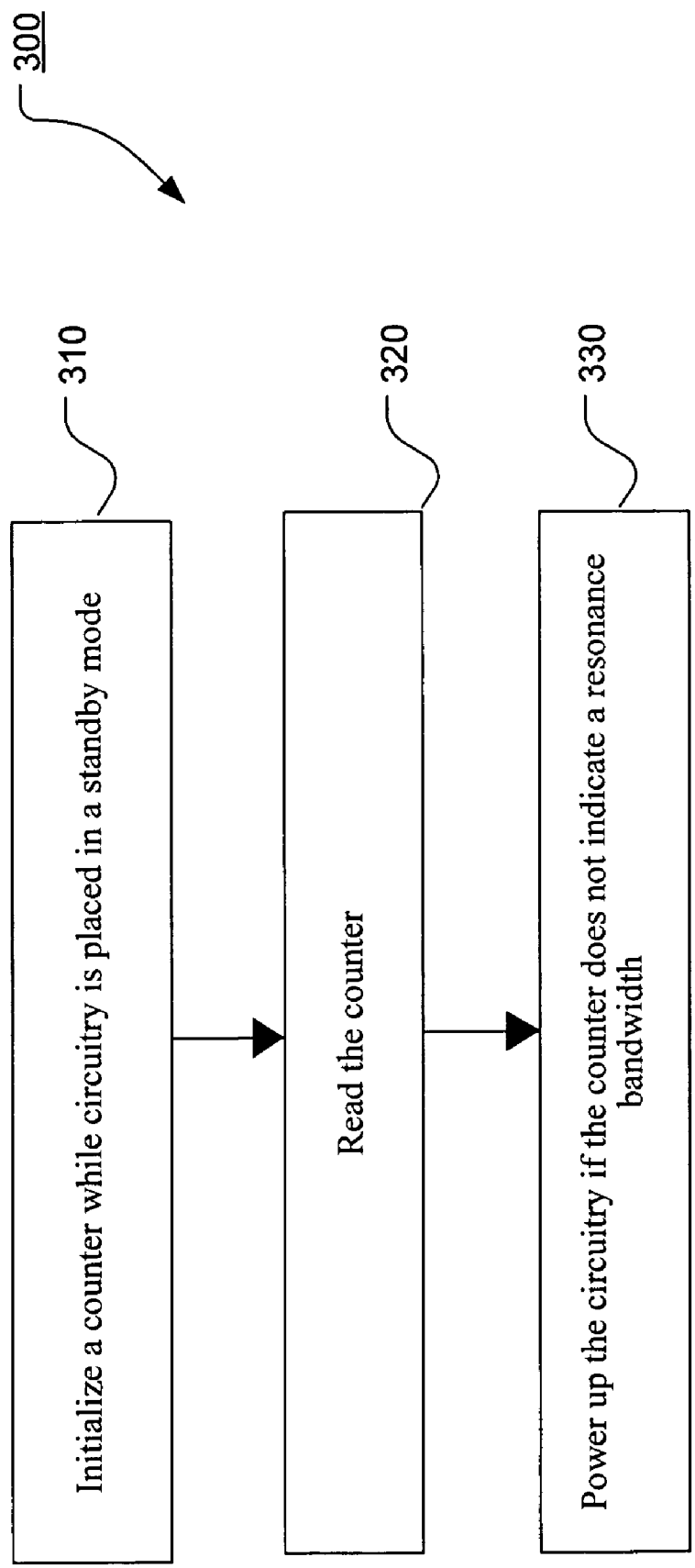
FIG. 3 is a flow diagram illustrating an embodiment method to counter resonance by controlling operating frequency.

FIG. 3 is a flow diagram illustrating an embodiment method to counter resonance by controlling operating frequency. In this embodiment, a counter may be initialized while circuitry is placed in standby mode as shown in block 310. The counter may be read in block 320, and the circuitry may be powered up if the counter does not indicate a resonance bandwidth.

An embodiment may further comprise powering down the circuitry after a settling time if the circuitry is not active. The present embodiment may further comprise waiting until the counter reaches a value and powering up the circuitry if the circuitry has not been powered up since the counter was initialized.

The present invention may be embodied in other specific forms without departing from its spirit or essential characteristics. The described embodiments are to be considered in all respects only as illustrative instead of restrictive or limiting. Therefore, the scope of the invention is indicated by the appended claims rather than by the foregoing description. All changes, modifications, and alterations that come within the meaning, spirit, and range of equivalency of the claims are to be embraced as being within the scope of the appended claims.

The invention claimed is:

1. A system comprising:
   a device including a power delivery network to deliver power;
   a link coupled with the device, the link to electrically communicate with the device; and
   control circuitry coupled with the link, the control circuitry to limit the link from powering up or down at a resonant frequency of the power delivery network.

2. The system of claim 1 wherein the control circuitry comprises a counter and enable logic, the counter to provide a counter value to keep track of the duration a link has been either powered up or down, and the enable logic to limit powering the link up or down if the counter value represents that result resonance would result from powering the link up or down.

3. The system of claim 1 wherein the link is at least one of a voltage mode link and a current mode link.

4. The system of claim 3 wherein the link is at least one of a unidirectional and a bidirectional link.

5. The system of claim 1 further comprising a second device with a power delivery network, the second device coupled to the link, the control circuitry to limit the link from powering up or down at a resonant frequency of the power delivery network of either device.

6. The system of claim 1 wherein the control circuitry is in the device.

7. The system of claim 2 wherein the counter value is programmable.

8. A method comprising:
   - initializing a counter while circuitry is placed in a standby mode;
   - reading the counter; and
   - powering up the circuitry if the counter does not indicate a resonance bandwidth.

9. The method of claim 8 further comprising powering down the circuitry after a settling time if the circuitry is not active.

10. The method of claim 9 further comprising waiting until the counter reaches a value and powering up the circuitry if the circuitry has not been powered up since the counter was initialized.

11. The method of claim 8, wherein the counter is programmable.

12. An apparatus comprising:
    - a counter to provide a count value;
    - enable logic coupled with the counter; and
    - circuitry coupled with the enable logic, the circuitry to be powered up or down if the counter value is outside of a resonance bandwidth for the circuitry to be powered up or down.

13. The apparatus of claim 12, wherein the counter is to count a settling time, the circuitry to be powered down if it is not being used.

14. The apparatus of claim 13, wherein the counter to reach a certain value before the circuitry is powered down if the circuitry is being used.

15. The apparatus of claim 12, wherein at least one of the counter and the enable logic is programmable.

16. A system comprising:
    - a device including a power delivery means to deliver power;
    - a communication means coupled with the device, the communication means to electrically communicate with the device; and
    - control means coupled with the communication means, the control means to limit the communication means from powering up or down at a resonant frequency of the power delivery means.

17. The system of claim 16 wherein the communication means is at least one of a voltage mode link and a current mode link.

18. The system of claim 16 wherein the communication means is at least one of a unidirectional and a bidirectional link.

19. The system of claim 16, wherein the control means comprises a counter and enable logic, the counter to provide a counter value to keep track of the duration a communication means has been either powered up or down, and the enable logic to limit powering the communication means up or down if the counter represents that result resonance would result from powering the communication means up or down.

20. The system of claim 19 wherein at least one of the counter and the enable logic is programmable.

21. The system of claim 16 further comprising a second device with a power delivery means, the second device coupled to the communication means, the control means to limit the communication means from powering up or down at a resonant frequency of the power delivery means of either device.

* * * * *